May 6, 1958 P. SAMMARCO ET AL 2,833,287
SHELLING AND CLEANING DEVICE FOR CORN PICKERS
Filed July 23, 1956 2 Sheets-Sheet 1
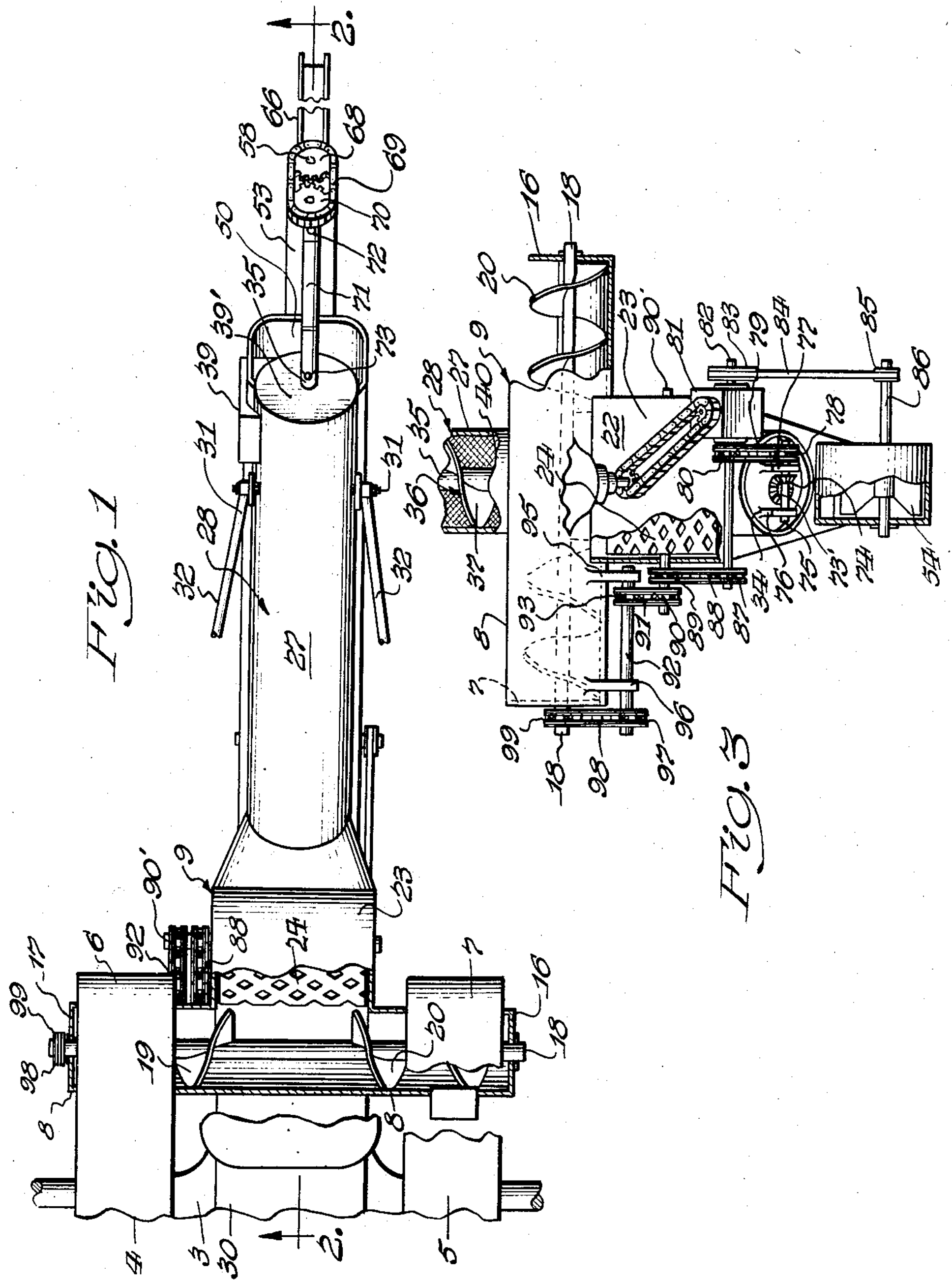
Inventors
Peter Sammarco
Ronald F. Zitko
Paul O. Pippel
Attorney SHELLING AND CLEANING DEVICE FOR CORN PICKERS
Filed July 23, 1956 2 Sheets-Sheet 2
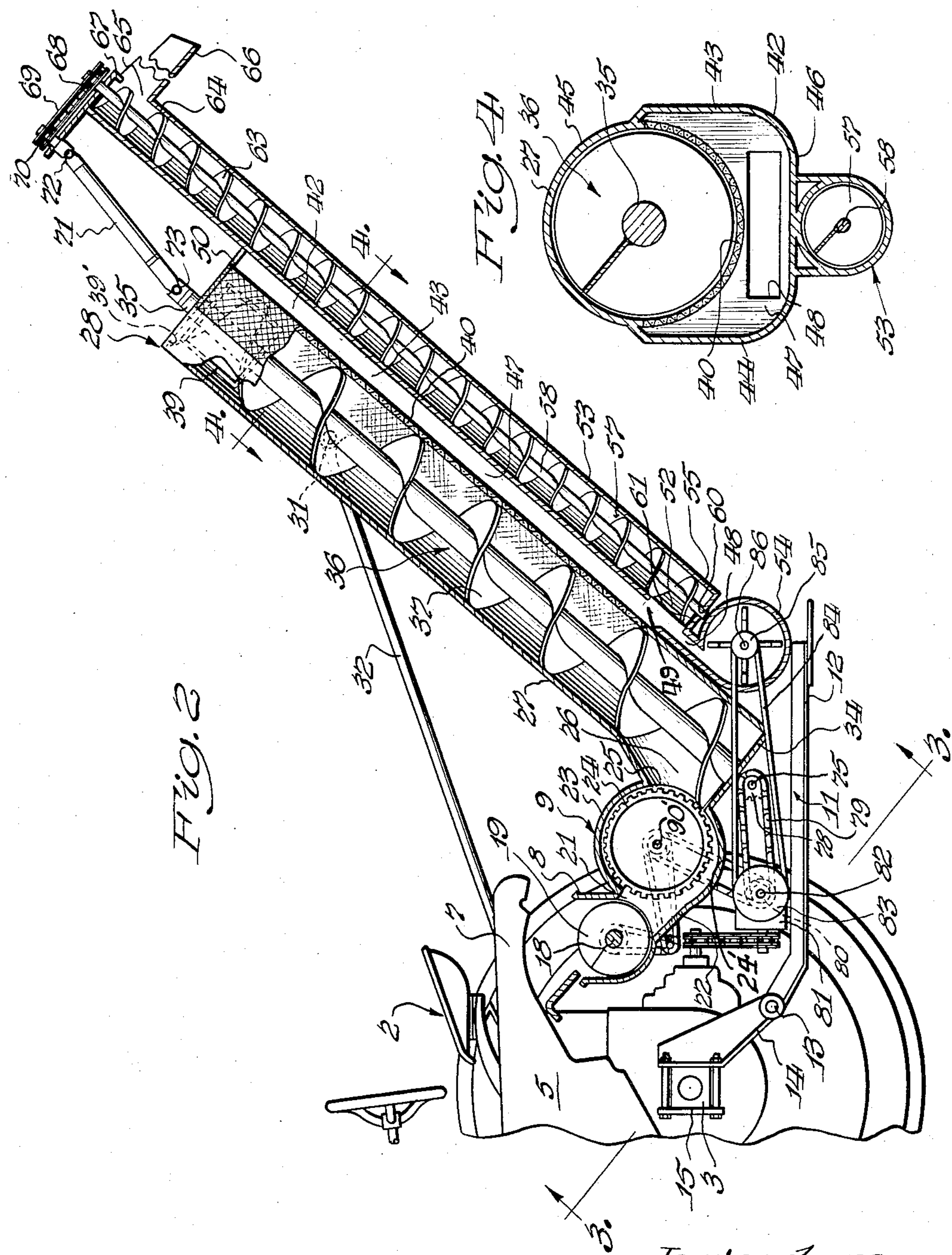
Inventors
Peter Sammarco
Ronald F. Zitko
Paul O. Pippel
Attorney

United States Patent Office 2,833,287

Patented May 6, 1958

2,833,287

SHELLING AND CLEANING DEVICE FOR CORN PICKERS

Peter Sammarco, Chicago, and Ronald F. Zitko, Cicero, Ill., assignors to International Harvester Company, a corporation of New Jersey Application July 23, 1956, Serial No. 599,409

3 Claims. (Cl. 130—6)

This invention relates to corn harvesters and more specifically to a novel shelling and cleaning device therefor.

In order to conserve storage space and to facilitate handling, the current farm practice is to attempt to harvest and shell corn in a continuous operation and thus to dispose of the husks and cobs in a field where they can be plowed under.

The principal object of the invention is to provide a novel shelling unit which is adapted to be mounted directly on the tractor in receiving relation to the corn pickers.

A more specific object of the invention is to provide a novel compact shelling unit wherein the components are arranged in a novel and efficient manner to obtain effective transition of the crops from one unit to the other without the necessity of extensive conveyors and the like.

A further object of the invention is to provide a novel shelling and cleaning device wherein the cleaning device is afforded an extensive working length and is so positioned not to make the mechanism incongruous or unwieldy.

These and other objects of the invention become more apparent from the specification and drawings wherein:

Figure 1 is a plan view of the novel mechanism on a tractor fragmentarily shown, portions of the mechanism being broken away and in section to clarify the illustration;

Figure 2 is a longitudinal sectional view taken substantially on the line 2—2 of Figure 1;

Figure 3 is a perspective sectional view taken substantially on line 3—3 of Figure 2, and Figure 4 is a cross-sectional view taken substantially on the line 4—4 of Figure 2.

Describing the invention in detail and having reference to the drawings there is shown a tractor generally indicated 2 with a rear axle 3 on each end of which there are mounted the picker units 4 and 5 which have their delivery ends 6, 7 overhanging the receiving trough 8 of the shelling mechanism generally designated 9.

The shelling mechanism 9 in addition to the trough 8 has a mounting structure 11 integrated with the trough, said mounting structure including a support frame 12 which is pivotally mounted at its forward end on a shaft 13 which is carried from attaching brackets 14 secured as by clamping assemblies 15 to the adjacent portion of the axle structure 3.

The conveyor trough 8 extends transversely of the tractor and is disposed rearwardly of the rear axle structure 3 and at its closed opposite end walls or panels 16 and 17 rotatably supports an auger shaft 18 on which are mounted reversely spiral flights 19 and 20 which extend inwardly from opposite ends of the trough 8 and terminate at opposite sides of a central opening 21 which communicates with a downwardly and rearwardly inclined chute structure 22 which leads into a shelling cage 23 integrally united with the trough 8 or suitably connected thereto as by riveting.

The chute 22 forms the inlet to the shelling cage 23 within which is rotatably mounted a shelling cylinder 24 which operates over the concave 24'. The shelling cage 23 is substantially narrower than the length of the conveyor trough 8 and is centered thereon and has an outlet 25 at its rear end which discharges into the lower end 26 of a housing or casing 27 of a combination conveyor and cleaning device generally indicated 28.

It will be observed that the cleaning and conveying assembly comprising housing 27 extends diagonally upwardly and rearwardly from the shelling cage substantially in longitudinal alignment with the body portion 30 (Fig. 1) of the tractor and that adjacent to its upper end is connected as at 31 to tension rod structures 32 which at their forward ends are suitably connected to the tractor. The conveyor tube 27 is closed at its lower end by a bottom end wall 34 which journals the center shaft 35 of an auger generally indicated 36 which auger comprises a flight 37 connected to the shaft 35 and extending from the bottom to the adjacent upper end of the tube 27. The tube 27 is provided adjacent to its upper end with a side outlet opening 39 through which the material which is carried by the auger 36 is discharged as it is brought against the upper end wall 39' of the housing 27. The auger tumbles the material over a foraminous bottom 40 of the auger housing 27, the bottom being made up in the form of a grid or a screen and disposed intermediate the ends of the tube 27 and constituting the lower or under semi-cylindrical portion thereof.

The material discharges through the screen 40 into a trough or duct 42 which is substantially U-shaped and has its side walls 43 and 44 connected at their upper ends to the upper portion 45 (Fig. 4) of the conveyor housing 27 and having an interconnecting lower wall 46 underposed with respect to the screen 40 and providing a chute 47 through which the material gravitates downwardly as it is winnowed by an air stream issuing from the outlet of a fan nozzle 48 (Fig. 2) disposed in longitudinal alignment with the lower end 49 of passage 47. The blast of air is adapted to blow out chaff and the like through the upper outlet end 50 of the passage 47 while the heavier material gravitates downwardly into the inlet end 52 of the conveyer 53 which is adjacent to the fan 54 beneath the lower extremity 55 of the housing 53 on the frame structure 12 and integrated with the trough 44.

The conveyer 53 comprises an auger 57 which has a shaft 58 journalled as at 60 on the lower end wall 61 of the housing 53, the auger 57 having a flight 63 which fits within the tube 53 and extending to the upper end 64 of the tube 53 for discharging the grain through upper discharge opening 65 in the bottom side of the housing 53 into a communicating chute 66 which is adapted to discharge the grain into a trailing wagon, not shown. The upper end of the shaft 58 is journalled on the top wall 67 of the housing 53 and is connected to a sprocket 68 which is driven by a chain 69 trained about a sprocket 70 on the upper end of a shaft extension 71 which is journalled on an extension of the wall 67, the shaft 71 being connected as by universal joints 72 and 73 to the auger shaft 35. The shaft 35 has a bevel gear 73' (Fig. 3) at its lower end and meshing with a bevel gear 74 on a substantially horizontal shaft 75 which is suitably supported from bearing supports 76, 77 mounted on the bottom wall 34 of the housing 27. The shaft 75 is driven by a sprocket 78 which is driven by a chain 79 which in turn is driven by a sprocket 80 at one side of a gear box 81 which may have the usual meshing bevel gears, said sprocket 80 being mounted on a shaft 82 of the gear box and one end of the shaft 82 may carry a pulley 83 which drives a belt 84 which in turn drives a pulley 85 which is connected to the shaft 86 of the fan 54.

The shaft 82 is further connected to a sprocket 87 which drives a chain 88 which in turn drives a sprocket 89 connected to the shaft 90' of the shelling cylinder 24. The shaft 89 carries a second sprocket 90 which drives a chain 91 which drives a shaft 92 through a sprocket 93 thereon, the shaft 92 being supported on bearing structures 95 and 96 on the bottom of the trough 8 and extending outwardly of one end of the trough and provided with a sprocket 97 which drives a chain 98 which drives a sprocket 99 mounted on the shaft 18 of the auger flight. Thus it will be observed that a novel and efficient and simple arrangement is provided for handling the crop as it is discharged from the harvesting units.

What is claimed is:

1. The combination of a shelling unit having a receiving chute and a rearward discharge opening, a cleaning component comprising an auger conveyor inclined upwardly and rearwardly from said unit and having a casing with an upper discharge end and a lower receiving end communicating with said discharge opening in said unit, said conveyor having an auger within said casing, said casing having an underside foraminous portion for sifting grain therethrough, a duct structure beneath said portion inclined downwardly and forwardly and having lower and upper open ends and substantially coextensive with said underside of the casing, said foraminous underside defining the top of said duct, a fan having a nozzle aligned with said duct and spaced from said lower end thereof for blowing a stream of air through the aggregate descending into the duct through said foraminous portion of the casing and blowing dirt and chaff out of said upper end of the duct while the grain gravitates downwardly and discharges through said lower end, and an auger conveyor beneath the duct having a receiving end communicating with the lower end of the duct and having an upper discharge end extended upwardly and rearwardly of the discharge end of the cleaning component.

2. For a corn shelling device mounted upon a tractor having a rear axle portion and spaced supporting wheel means, a trough extending transversely of the tractor behind said rear axle portion and between said wheel means, a shelling unit mounted behind said trough intermediate its ends and including a concave disposed in receiving relation to the trough via an opening therein and having a discharge end rearwardly thereof, a shelling cylinder cooperatively associated with the concave and rotatable in a direction sweeping the corn therebeneath through said discharge ends of the concave, and a cleaning and conveying assembly disposed rearwardly of said shelling unit in fore and aft alignment therewith and including a housing inclined upwardly and rearwardly from said unit and having a lower end open to receive material from said rearward end of the concave and including means for moving the material upwardly within said housing, said housing having a foraminous bottom adapted to sift corn therethrough, a duct having a closed bottom beneath said foraminous bottom and spaced upstanding sides connected to said housing and with said foraminous bottom defining an air passage substantially coextensive with said foraminous bottom, means positioned at one end of the passage for blowing air therethrough and through said foraminous bottom, and means for receiving and conveying the grain underposed with respect to said duct and having one end communicating with one end of the duct.

3. A shelling and cleaning unit for attachment to a tractor having a forward receiving component elongated transversely of the tractor, a shelling component disposed intermediate the ends of the receiving component rearwardly thereof for receiving material therefrom and arranged to discharge the material rearwardly, and a conveying and cleaning assembly having a housing extending upwardly and rearwardly from said shelling component and having a lower end disposed to receive from the shelling component and having an upper discharge at one side thereof for bulk material and having a bottom foraminous portion for sifting corn therethrough, means in the housing for moving the material from the lower to the upper end thereof over said bottom portion, a duct under said bottom portion of the housing and generally paralleling the same and having lower and upper open ends, said duct being longer than the entire length of said foraminous bottom, and a fan having a nozzle directed lengthwise of the duct and spaced below said lower end of the duct for directing an air blast through the duct and blowing chaff and dirt out of the upper end thereof and blowing into said housing.

References Cited in the file of this patent

UNITED STATES PATENTS

| | | |
|---|---|---|
| 2,347,871 | Andrews et al. | May 2, 1944 |
| 2,518,302 | Gerber | Aug. 8, 1950 |